Jan. 24, 1956
C. ERICKSON ET AL
2,731,752
ARTIFICIAL TREE AND METHOD OF MAKING
Filed April 28, 1953
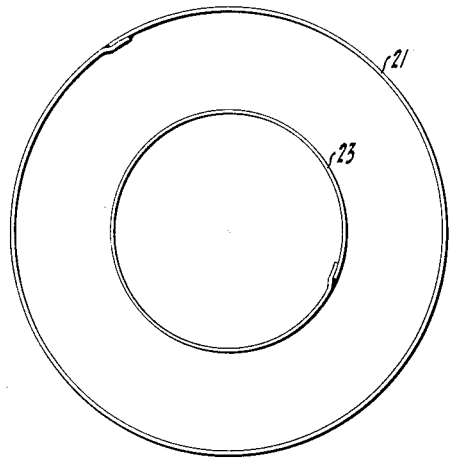
FIG.2
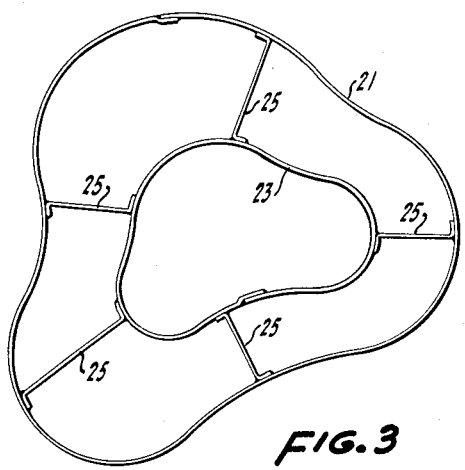
FIG.3
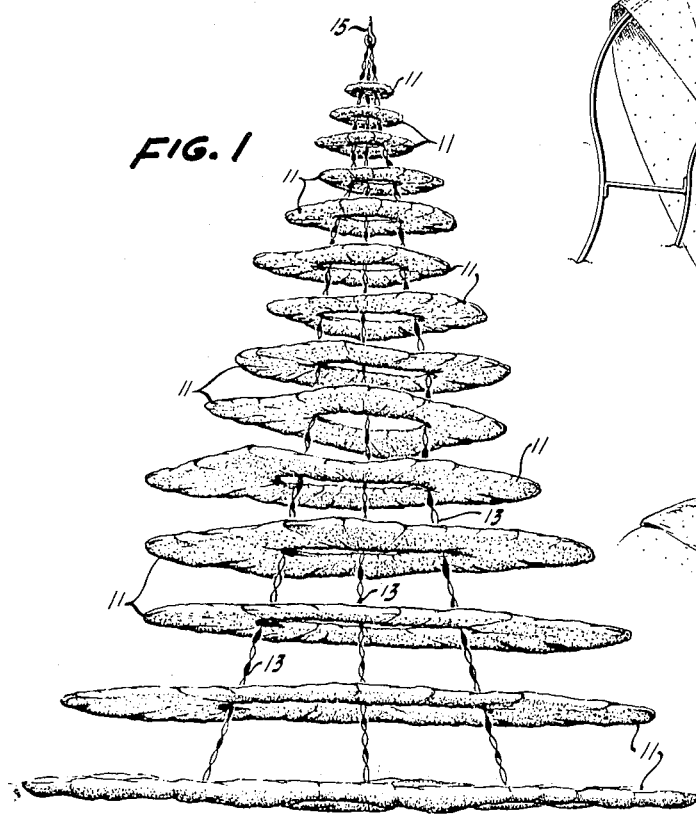
FIG.1
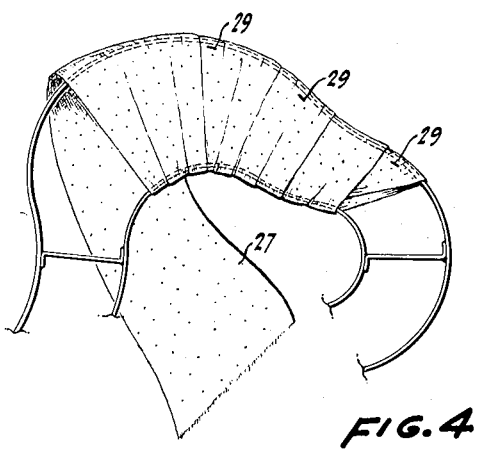
FIG.4
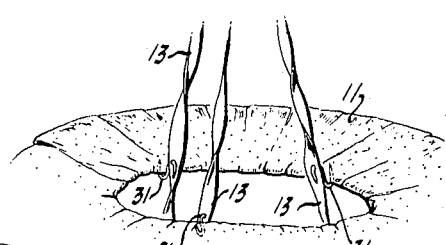
FIG.5
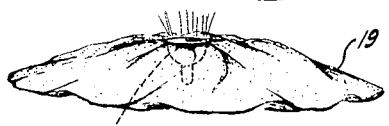
INVENTORS
CHARLOTTE ERICKSON
BY LENNART G. ERICKSON
Lippincott & Smith
ATTORNEYS

United States Patent Office 2,731,752
Patented Jan. 24, 1956

2,731,752

ARTIFICIAL TREE AND METHOD OF MAKING

Charlotte Erickson and Lennart G. Erickson, Hillsborough, Calif.

Application April 28, 1953, Serial No. 351,554

4 Claims. (Cl. 41—15)

The present invention relates to an artificial tree for use as a display device, stage prop, and the like. In the advertising field, for example, the device of the instant invention may comprise an attractive, offsetting or drawing attention to property offered for sale, particularly dwelling following modern architectural lines. The tree also admits of novel illumination for night-time employment.

Briefly, the device of the present invention is comprised of a plurality of layers of loop character assembled in spaced-apart relation and preferably decreasing in external dimensions or area along the axis substantially common to all of the layers. This arrangement provides the tapering effect generally exhibited by members of the fir family. However, the individual layers comprising the tree are otherwise haphazardly shaped.

Each layer may be conveniently formed by a pair of elongated members, such as lengths of wire, bent in the form of rings or circles and having their ends secured together to close the circles. The circles are of different diameter to define respectively the internal and external epripheries of the layer to be formed. Next, the circular configurations are haphazardly shaped and secured together in spaced-apart relation by ribs extending between the members, being fixed to each member to comprise forms for the individual layers. The elongated members so shaped and ribs therebetween are enclosed in fabric, preferably of a type that is light transmissive, at least translucent. This may conveniently be accomplished by employing strip material to wrap the forms in a spiral manner. If the forms are loosely wrapped, a "billowing effect" is achieved in each layer.

The layers thus formed are then assembled in spaced-apart relation with the largest layer assuming the lowermost position, and the respective layers thereabove decreasing in size or area to provide a tapered tree. This is conveniently accomplished by employing a plurality of stringers of cord, ribbon or other flexible material, each provided with hooks for gripping the individual layers, and each extending the length of the tree to attach to a support from above. The tree may therefor be easily collapsed and packaged. Assembly is accomplished by merely lifting the cord or ribbon adjacent to the uppermose or smallest layer and attaching it to an overhead support.

A lighting source may be deployed beneath the lowermost layer to direct light onto and through the respective layers whereby each layer is caused to glow thereby effecting a display device, particularly apparent during the nighttime.

With the foregoing in mind, among the objects of the present invention are the following: the provision of an artificial tree admitting of inexpensive manufacture, the provision of a collapsible artificial tree easily expandable into tree configuration, the provision of an artificial tree light weight in construction, and the provision of an artificial tree employing translucent layers adapted to glow when illuminated by an external source of lighting.

Other and further objects of the present invention will become apparent to those skilled in the art from a reading of the following detailed description thereof when taken in the light of the accompanying drawings wherein:

Fig. 1 shows in side elevation a tree in accordance with the present invention;

Fig. 2 is a view in plan of a pair of rings or circles forming the basis for a single layer of the tree of Fig. 1;

Fig. 3 shows the circles of Fig. 2 shaped haphazardly and provided with ribs securing the same in spaced apart relation to comprise an individual layer form;

Fig. 4 shows the form of Fig. 3 partially enclosed in strip-like material spirally wrapped thereon; and, Fig. 5 shows in detail a single layer of the tree of Fig. 1 secured to the supporting means shown in the form of ribbon stringers.

The completed tree shown in Fig. 1 is comprised of a plurality of layers 11 respectively decreasing in area along the vertical direction and supported in spaced-apart relation by a plurality of flexible stringers 13, extending over a hook 15 provided for supporting the tree from an overhead structure. A source of light 17 is partially concealed beneath a false base 19 for the tree. The source 17 may comprise the sole external illumination for the tree.

The layers 11, as shown, are conveniently fabricated from lengths of wire 21 and 23 shown in the form of rings or circles in Fig. 2. The extremities of the wire 21 and 23 are overlapped and soldered thereby comprising the closed loop configuration depicted. By way of illustration, it may be mentioned that wire suitable for forming the rings comprising the various layers 11 may be No. 10 gauge for the larger or lowermost layers, decreasing in size to Nos. 12 and 14 for the smaller layers. The rings formed by the wires 21 and 23 are haphazardly or irregularly shaped as shown in Fig. 3 in a manner indicative of a cross-section through a natural tree. Generally, the configuration thus formed by the internal wire 23 resembles that of the external wire 21. A plurality of ribs 25, shown as the Z shaped spokes interposed between the rings 23 and 21, serves to secure the rings in spaced-apart relation, soldering serving as one convenient means of attaching the spokes 25 to the rings 21 and 23. It is thus seen that the relationship of the rings 21 and 23 to each other is such that they form an annulus whose outer dimension is that of the ring 21 and whose inner dimension is that the ring 23. A plurality of rings haphazardly or irregularly bent, as shown in Fig. 3, and suitably spaced apart and supported by the ribs 25 form a plurality of annuli which may be strung together generally alined with the central openings, as shown particularly by Fig. 1. The configurations are such that the inner periphery of each ring is of generally closely similar shape to its outer periphery.

After the form for a layer as depicted in Fig. 3 has been made, light transmissive or translucent strip material 27 is employed to wrap spirally the form as is shown in Fig. 4. The spiral wrapping may be attached to the form by sewing, that is providing a hem along the wires 21 and 23 or by merely stapling through the layer as is represented by the staples 29. If the form is wrapped loosely, the individual layers are given a billowing effect which serves to augment the glow appearing in each layer when light from the source 17 is directed onto and through the individual layers. Also, if desired, scintillating material may be sprinkled upon the translucent wrapping cloth 27.

Fig. 5 shows in detail suitable means for attaching the various layers 11 to the stringers 13. S-shaped hooks 31 are arranged suitably to pierce both the stringers 14 and the layers 31 providing adequate support. Also the S- shaped hooks 31 admit of ease in movement for distribution of the various layers.

What is claimed is:

1. A display device in the form of an artificial tree comprising a plurality of translucent layers each of loop configuration wherein the internal and external peripheries of each of the layers are irregularly and generally haphazardly contoured, flexible means for hanging the layers in spaced apart relation and generally axially one with respect to another, the internal and external peripheral dimensions of each of the layers respectively increasing along the common axis from the point of support with the distance from the common axis to the periphery being generally irregular for the stacked layers and means for directing light onto the layers through the central area of the largest of the layers to effect glowing in each of the layers.

2. An artificial tree comprising a plurality of layers all of generally distorted annular shape each having an area exceeding its thickness, means to maintain general rigidity in both the external and internal peripheral pattern of each irregular configuration, the said layers respectively having different areas and the opening in each annulus generally conforming in shape to its outer periphery, means to maintain the relative internal and external peripheral relationship, and flexible means for hanging the layers in spaced apart relation from a support point so that the plurality of annular members are adapted to be hung along a common vertical axis to provide the effect of a tapered tree with the layer of smallest area being located nearest the point of support and the larger areas progressively removed therefrom.

3. An artificial tree comprising a plurality of layers of loop configuration defining respectively different areas, each of the areas including a pair of closed elongated members shaped irregularly and respectively defining the internal and external peripheries of a generally annular configuration, ribs secured to the closed elongated members in spaced apart relation to hold the said two members in substantially fixed relationship relative to each other, a light translucent covering enclosing the looped elongated members and ribs to form the annulus of irregular outer and inner periphery, means adapted for securement at spaced apart locations on the irregular peripheries of the inner member for supporting the layers and permitting the layers to hang therefrom by gravity in substantially vertically spaced apart relationship and generally axially alined relative one to the other, the layers being arranged in generally increasing area with increasing distance from the point of support to provide when hung the effect of a tapered tree and means for directing light onto and through the layers to effect glow therein.

4. An artificial tree comprising a plurality of layers each formed as an irregularly distorted annular loop and collectively defining different areas, each of the layers including a pair of closed elongated members shaped peripherally irregularly and respectively defining the internal and external peripheries of the loop configuration, cross members secured to the irregularly shaped elongated members in spaced apart relation with each cross member secured to each of the inner and outer closed members, a light translucent covering enclosing the elongated members and cross members, flexible means secured at spaced apart locations on the inner irregularly spaced closed member for supporting the layer in substantially vertically spaced apart relation to its adjacent layer and generally axially with respect to all of the other layers, the layers being arranged in increasing area order from the point of support, and means for directing light onto and through the layers to effect glow therein.

References Cited in the file of this patent

UNITED STATES PATENTS

| | | |
|---|---|---|
| 267,277 | Strasser | Nov. 7, 1882 |
| 835,445 | Leonard | Nov. 6, 1906 |
| 1,920,551 | Daum | Aug. 1, 1933 |
| 2,101,898 | Crosser | Dec. 14, 1937 |
| 2,231,601 | Snyder | Feb. 11, 1941 |
| 2,473,855 | Braun | June 21, 1949 |
| 2,575,512 | Erlewine | Nov. 20, 1951 |